E. V. BODDY.
CAMERA.
APPLICATION FILED JULY 8, 1915.
1,187,883.
Patented June 20, 1916.
2 SHEETS—SHEET 2.
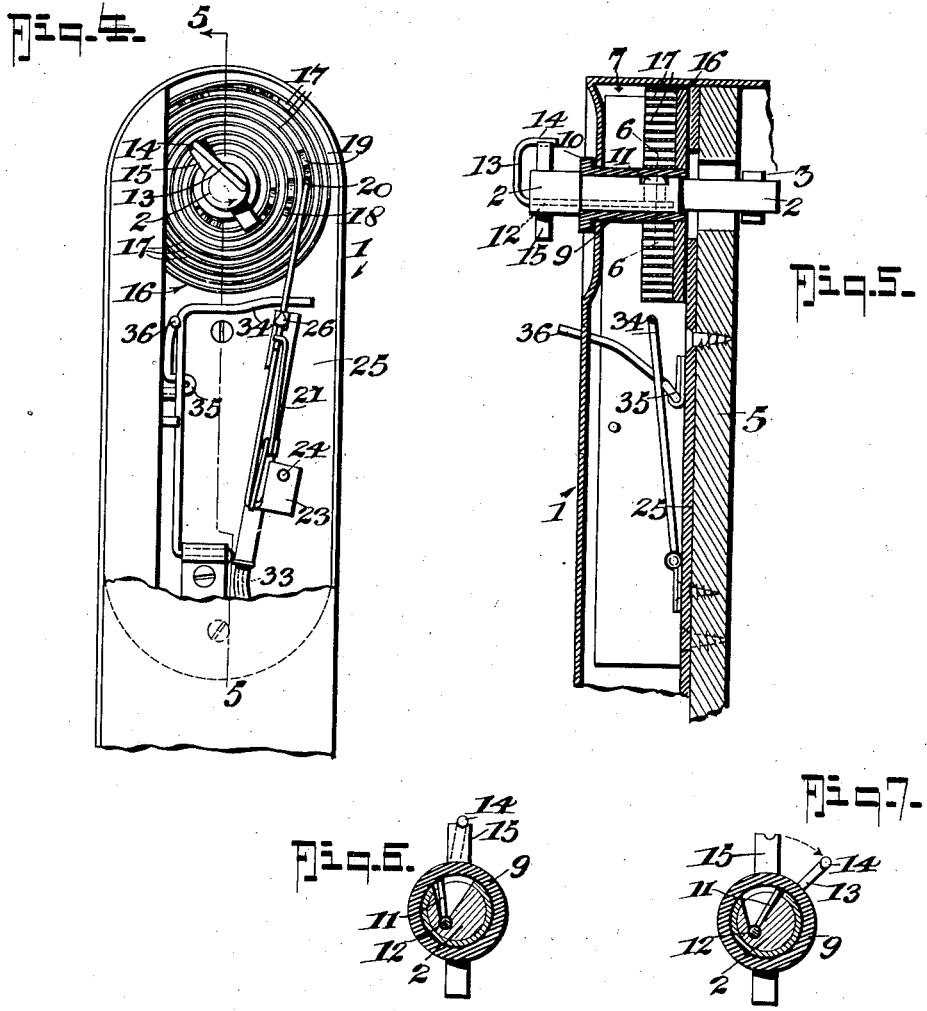
Witnesses
J. F. Schrott
Inventor
Edward V. Boddy.
By H. B. Willson &co
Attorneys

UNITED STATES PATENT OFFICE.

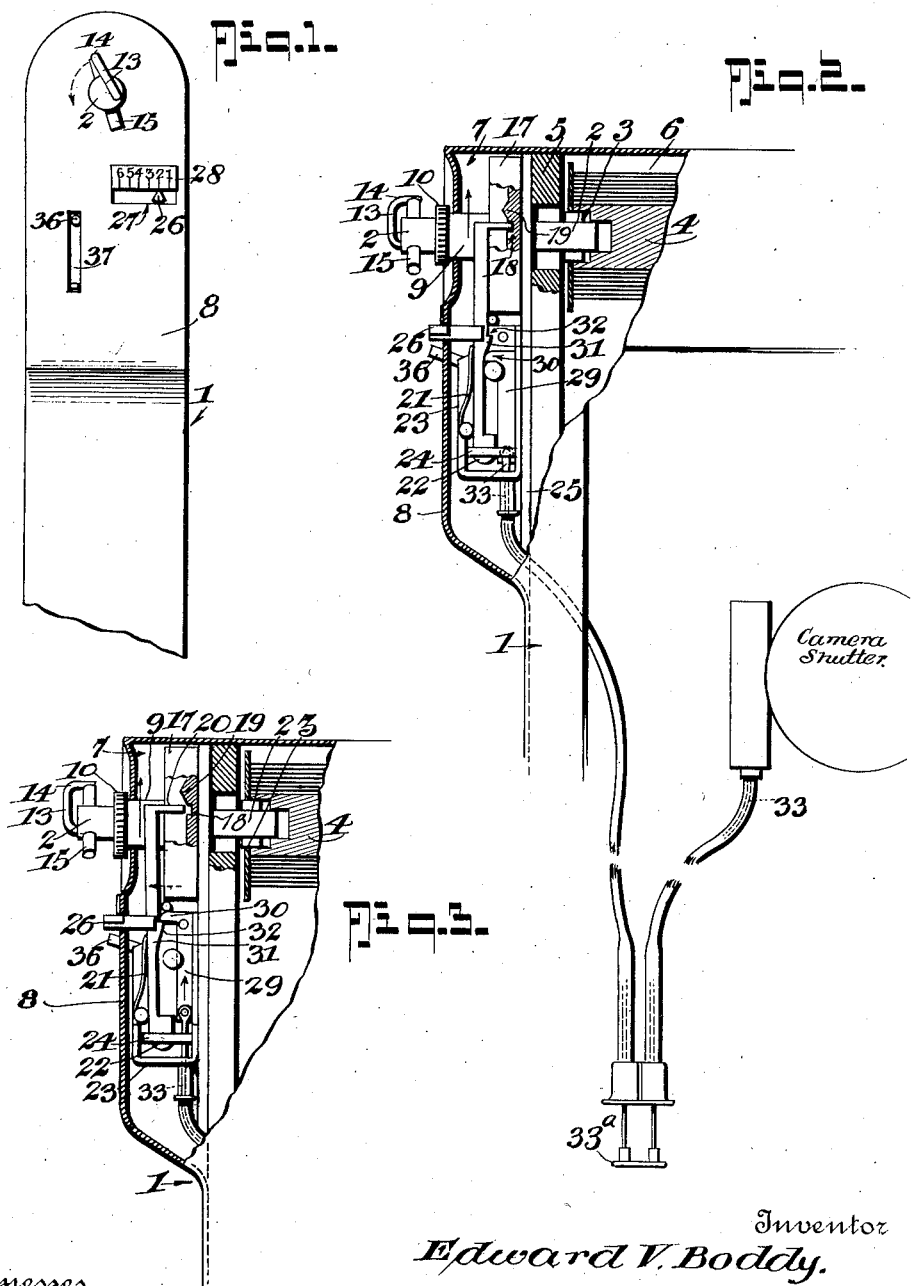

EDWARD V. BODDY, OF ARTESIA, NEW MEXICO.

CAMERA.

1,187,883.    Specification of Letters Patent.    Patented June 20, 1916.

Application filed July 8, 1915. Serial No. 38,731.

*To all whom it may concern:*

Be it known that I, EDWARD V. BODDY, a citizen of the United States, residing at Artesia, in the county of Eddy and State of New Mexico, have invented certain new and useful Improvements in Cameras; and I do declare the following to be a full, clear, and exact description of the invention, such as will enable others skilled in the art to which it appertains to make and use the same.

My invention relates broadly to improvements in photographic equipment, and more particularly to cameras, the object of the invention being to provide extremely simple and inexpensive, yet very efficient means for preventing the films within such devices from being wound more or less than a predetermined amount, thus always insuring that the correct portions of the film be directly alined with the lens, before exposures can be made.

With this general object in view, the invention resides in certain novel features of construction and in unique combinations of parts hereinafter claimed and fully described by reference to the accompanying drawings wherein:—

Figure 1 is an end view of a camera, with the invention attached thereto; Fig. 2 is a front elevation of the camera partly broken away and illustrating the positions of parts before one film is exposed; Fig. 3 is a similar view showing the relation of parts directly after exposure of said film; Fig. 4 is an end view with parts of the camera case broken away to more clearly disclose parts disposed on the interior thereof; Fig. 5 is an enlarged section as seen along the plane indicated by the line 5—5 of Fig. 4; Figs. 6 and 7 are detail vertical transverse sections taken on the line 6—6 of Fig. 5, showing two positions of a cam employed in anchoring the winding shaft to the traveling track to be described.

In these drawings which constitute a part of the application, and in which similar reference characters designate corresponding parts throughout the several views, 1 indicates broadly a camera, this camera including a winding shaft 2 having on its inner end a head 3 for reception in the usual socket formed in one end of the film winding spool or reel 4. The winding shaft 2 is of greater length than usual, and projects not only through the adjacent end 5 of the reel magazine 6, but spans a compartment 7 spaced outwardly from said magazine.

Surrounding the shaft 2 and disposed in the compartment 7, is a sleeve 9 having on its outer end a milled flange 10 which is disposed on the exterior of the end wall 8 in position to be grasped by the photographer. Normally, the sleeve 9 is locked frictionally against turning in respect to the shaft 2, by a locking dog 11 which is formed on the inner end of the eccentrically mounted shaft 12 which is confined rotatably in the aforesaid shaft 2, the dog 11 being disposed in an appropriate cavity in said shaft 2, but being capable of projection therefrom to such an extent as to frictionally abut the inner side of the sleeve 9, when the shaft 12 is rotated by a crank 13 with which its outer end is provided, said crank being here shown as having a finger 14 which, when the cam is projected, is received in a cavity formed in one end of a transverse finger bar 15 which is carried by the outer end of the shaft 2. By this means, the sleeve and said shaft 2 are normally locked together, but it will be evident that the crank 13 serves as a cut-out for disconnecting the two parts, thus allowing the shaft to be shifted endwise or rotated within the sleeve for making necessary adjustments of the reel 4 and for initially inserting the head 3 into the socket in said reel.

The inner end of the sleeve 9 is provided with a disk 16 on whose outer side a spiral web 17 is formed, the space between the several convolutions of the web, and the portions of the disk 16 exposed in said spaces, constituting what may well be termed a coiled or spiral track. At intervals spaced unequally throughout the length of this track, sockets 18 are formed in the outer face of the disk 16, the opposite walls of said sockets constituting stop means in a manner yet to be explained, while extending outwardly from the disk 16 at points adjacent one side of each socket 18, is a substantially V-shaped cam 19, these cams being likewise designed for reasons to be set forth.

Disposed in contact with the outer face of the disk 16, between the convolutions of the web 17, or in other words upon the spiral track, is a locking dog 20 which is automatically projected, by a spring 21, into the notches 18 when the reel 4 is being rotated, whereby to allow rotation of this reel only to such an extent as to expose an appropriate area of film in rear of the lens. It is to be observed, however, that before the dog 20 is projected into any one of the sockets 18, it is first swung outwardly by one of the cams 19, this being necessary in order to release a device which normally holds the dog retracted to such an extent as to allow the reel to be rotated, the details of this device being hereinafter fully described.

The dog 20 is anchored against rotation with the track, by being pivotally mounted at 22 to a laterally swinging bracket member 23 which is pivoted at 24 to a face plate 25 with which the wall 5 is preferably provided, this bracket member being provided with an appropriate indicator 26 which is so constructed as to guide the dog 20 in its swinging movement. The indicator 26 projects through a slot 27 in the end wall 8 and coacts with a series of indicating numbers or the like 28 inscribed adjacent said slot. By this construction, as the bracket member 23 is swung laterally by traveling of the dog 20 around the spiral track, the indicator 26 will be disposed adjacent the numeral 1, when the dog prevents rotation of the reel 4, as film number 1 is alined with the lens, this means being designed to keep conveniently before the eye, the number of the film being exposed. Needless to say, as the bracket member 23 continues to move laterally as the several films are being exposed, the device 26 always indicates the number of the film upon which the photograph is being taken.

In addition to the parts just described, the bracket member 23 carries a dog releasing plunger 29 having on one end a nose 30 into the path of which a cam 31 on the dog 20 projects, whereby when said dog is inserted in one of the sockets 18 to prevent further rotation of the reel 4 in either direction, and the plunger 29 stands retracted, projection of said plunger will force the nose 30 into contact with the cam 31, thereby shifting the dog out of the socket and allowing the film to be again advanced the necessary amount. By spring means not shown, the plunger 29 is normally retracted, but when it is once projected by operation of the shutter actuating means, a shoulder 32 at one end of the cam 31 is disposed in its return path, whereby the dog is prevented from being projected, into any of the sockets 18 until retracted to such an extent as to release the nose 30, and whereby the shutter is locked against further operation until the plunger is again released, thus preventing double exposure of any film. The releasing of the plunger is accomplished by rotation of the reel to expose another film by means now to be described. For further retracting the dog 20 to release the plunger, the cams 19 before described have been provided. One of these cams releases the nose 30 at such a moment as to allow the active end of the dog to be immediately projected into the adjacent socket, thus preventing further rotation of the reel and simultaneously releasing the shutter to allow another exposure to be made. This releasing of the locking dog, however, does not take place until the film positioned in rear of the lens has been exposed by proper actuation of the usual shutter, this operation being accomplished in the present application by the use of two incased wires 33 which lead to the single knob 34ª, one of said wires being carried by the shutter of the camera, while the other is connected with the plunger 29. By this means, the moment the shutter is actuated and the film is exposed, the dog 20 is released, and the reel 4 may be rotated to such an extent as to wind the exposed film thereon and position the next film for exposure. This winding operation may be performed as speedily as the photographer may wish, since the film cannot be excessively shifted on account of the fact that the locking dog 20 checks the movement of the reel at the proper time, and positively prevents rotation thereof until the shutter is actuated and the additional film is thereby exposed, actuation of the shutter now releasing the dog in the manner above set forth and retaining the same in released position until the reel is so rotated as to bring another cam 19 into contact with said dog, whereupon the operation previously described again takes place and is repeated successively until the entire film is exposed, the indicator 26 being gradually advanced from one end of the slot 27 to the other end thereof and indicating at all times the number of the film upon which a photograph is being taken.

When the locking dog has traveled from one end of its track or runway to the other end thereof, and it is necessary to shift the same to its initial or starting point, it becomes expedient to provide some means whereby said dog may be so shifted as to entirely clear the web 17. For this purpose, an angular arm 34 underlies said dog and is pivotally connected to the wear plate 25, a cam 35 being disposed beneath said arm and having an operating arm 36 which projects laterally through a slot 37 in the wall 8, whereby actuation of said arm 36 in the proper direction will so dispose the dog 20 as to allow it to be readily shifted from one end of the track to the other.

In the accompanying illustration, the device is shown so constructed as to allow the stop mechanism to check the rotation of the reel 4, six times, this type of the invention being designed for use upon films having six exposures, but if twelve exposure films are to be used, the track must be made longer and provided with twelve sockets 18.

From the foregoing description, taken in connection with the accompanying drawings, it will be evident that although extremely simple construction has been provided for the attainment of the desired end, a camera constructed in accordance with the invention will be highly efficient in operation and will possess a number of advantages. Particular emphasis is laid upon the provision of a coiled track, whether the same be spiral or helical, since by constructing the same in this manner it may be made the necessary length without unnecessarily encumbering the camera. However, the construction of the dog releasing means and the cutout for the stop mechanism, as well as the general construction of the device are all considered salient features of the invention.

In the drawings, certain specific details of construction have been shown for accomplishing probably the best results, and in the preceding such details have been described, but it will be evident that I need not be restricted thereto otherwise than to the extent to which he appended claims limit me.

I claim:—

1. The combination with a camera including a shutter, manually controlled operating means therefor and a film winding reel having an operating handle; of a traveling track moved upon rotation of said reel and having stops at predetermined intervals, a relatively stationary locking dog disposed on the track for coaction with the stops thereon, a member to be shifted to retract the dog, and means connecting said member and the shutter operating means, whereby to release the dog upon actuation of said shutter operating means.

2. The combination with a camera including a shutter, manually controlled operating means therefor and a film winding reel having an operating handle; of a traveling track moved upon rotation of said reel and having stops at predetermined intervals, a relatively stationary locking dog disposed on the track for coaction with the stops thereon, a member to be shifted to retract the dog, means connecting said member and the shutter operating means, whereby to release the dog upon actuation of said operating means, catch means for holding said member in shifted position whereby to retain the dog retracted to allow the reel to be rotated, and means for releasing the catch means upon rotation of the reel a predetermined amount.

3. The combination with a camera including a shutter, manually controlled operating means therefor and a film winding reel having an operating handle; of a traveling track moved upon rotation of said reel and having stops at predetermined intervals, a relatively stationary locking dog disposed on the track for coaction with the stops thereon, a member to be shifted to retract the dog, means connecting said member and the shutter operating means, whereby to release the dog upon actuation of said operating means, catch means for holding said member in shifted position whereby to retain the dog retracted to allow the reel to be rotated, and means on the track for releasing the catch means upon rotation of the reel a predetermined amount.

4. The combination with a camera including a shutter, manually controlled operating means therefor and a film winding reel having an operating handle; of a traveling track moved upon rotation of said reel and having stops at predetermined intervals, a relatively stationary locking dog disposed on the track for coaction with the stops thereon, a member to be shifted to retract the dog, means connecting said member and the shutter operating means, whereby to release the dog upon actuation of said operating means, catch means for holding said member in shifted position whereby to retain the dog retracted to allow the reel to be rotated, and releasing devices disposed at predetermined intervals on the track for releasing the catch means upon rotation of the reel a predetermined amount.

5. The combination with a camera including a shutter, manually controlled operating means therefor and a film winding reel having an operating handle; of a traveling track moved upon rotation of said reel and having stops at predetermined intervals, a relatively stationary locking dog disposed on the track for coaction with the stops thereon, a member to be shifted to retract the dog, means connecting said member and the shutter operating means, whereby to release the dog upon actuation of said operating means, catch means for holding said member in shifted position whereby to retain the dog retracted to allow the reel to be rotated, and releasing cams disposed at predetermined intervals on the track for releasing the catch means upon rotation of the reel a predetermined amount.

6. The combination with a camera including a shutter, manually controlled operating means therefor and a film winding reel having an operating handle; of a traveling track moved upon rotation of said reel and having stops at predetermined intervals, a relatively stationary locking dog disposed on the track for coaction with the stops thereon, a member to be shifted to retract the dog, means connecting said member and the shutter operating means, whereby to release the dog upon actuation of said operating means, catch means for holding said member in shifted position whereby to retain the dog retracted to allow the reel to be rotated, and releasing devices disposed adjacent the stops on the track for releasing the catch means upon rotation of the reel a predetermined amount.

7. The combination with a camera including a shutter, manually controlled operating means therefor and a film winding reel having an operating handle; of a traveling track moved upon rotation of said reel and having stops at predetermined intervals, a relatively fixed locking dog forced normally toward the track for coaction with the stops thereon to permit the rotation of the reel, a member to be shifted to retract the dog, connections between said member and the shutter operating means, whereby to actuate the former to retract the dog simultaneously with the actuation of said operating means, catch means carried by the dog member for retaining the latter projected to hold the dog retracted, thereby allowing the reel to rotate, and means on the track for releasing the catch means upon rotation of said reel a predetermined amount.

8. The combination with a camera including a shutter, manually controlled operating means therefor and a film winding reel having an operating handle; of a traveling track moved upon rotation of said reel and having stops at predetermined intervals, a relatively fixed locking dog forced normally toward the track for coaction with the stops thereon to permit the rotation of the reel, a member to be shifted to retract the dog, coacting cams on the dog and member for retracting the former upon shifting of the latter, means connecting said member and the shutter operating means whereby to retract the dog upon actuation of such means to allow the reel to rotate, coacting stop shoulders on the dog and member to prevent return of the latter to normal position until the former is further retracted, and dog retracting cams disposed at predetermined intervals on the track to further retract the dog when a stop on said track approaches, whereby the member may return to normal position and the dog may project to engage said stop.

9. The combination with a camera including a film winding reel, a shutter, and manually operated actuating means for said shutter, of a spiral track rotatable with the reel and having sockets at predetermined intervals, a relatively fixed dog forced normally toward said track for reception in the sockets thereof to limit the rotation of the reel, a plunger to be projected to retract the dog from the sockets, coacting cam members on the dog and plunger, means connecting the plunger and the shutter actuating means for projecting the former upon operation of the latter, coacting stop shoulders on the plunger and the dog for preventing return of the former to normal position until the dog is further retracted, and dog retracting cams carried by the track for further retracting said dog to release the plunger to allow the dog to be projected into an approaching socket.

10. The combination with a camera including a reel, a shutter, and manually operated means for actuating the shutter, of locking means for the shutter applied automatically after each operation thereof, a release for said locking means disposed adjacent the reel, a traveling track member moved by rotation of the reel, and release actuating devices disposed at predetermined intervals on said track member.

11. The combination with a camera including a shutter, operating means therefor, and a film winding reel; of a coiled track rotatable with said reel and having stop means disposed at predetermined points throughout its length, a movable member mounted independently of the track and anchored against rotation therewith, a locking dog pivoted to said member and disposed on the track for coaction with the stop means thereon, a releasing cam on the dog, and a dog releasing plunger connected with the shutter operating means for movement therewith and having a portion bearing against said cam.

12. The combination with a camera including a film winding reel; of a coiled track rotatable with said reel and having stop means disposed at predetermined points throughout its length, a movable member mounted independently of the track and anchored against rotation therewith, a locking dog pivoted to said member and disposed on the track for coaction with the stop means thereon, a cam carried by said dog and having a shoulder at one end, and a dog releasing plunger having a nose bearing against said cam and engaged with the shoulder when the dog is released.

13. In combination, a film winding reel having an operating shaft provided between its ends with a cavity and having an eccentric longitudinally disposed bore leading from said cavity through its outer end, stop means for controlling the rotation of the reel including a sleeve member surrounding the shaft and the cavity therein, a locking dog in said cavity for projection against said sleeve, a shaft extending from said dog through the eccentric bore, and operating means on the outer end of said last named shaft.

14. In combination, a film winding reel having an operating shaft provided between its ends with a cavity and having an eccentric longitudinally disposed bore leading from said cavity through its outer end, stop means for controlling the rotation of the reel including a sleeve member surrounding the shaft and the cavity therein, a locking dog in said cavity for projection against said sleeve, a shaft extending from said dog through the eccentric bore, a crank on the outer end of said last named shaft, and means for normally preventing movement of said crank.

15. In combination a film winding reel having an operating shaft provided between its ends with a cavity and having an eccentric longitudinally disposed bore leading from said cavity through its outer end, stop means for controlling the rotation of the reel including a sleeve member surrounding the shaft and the cavity therein, a locking dog in said cavity for projection against said sleeve, a shaft extending from said dog through the eccentric bore, a crank projecting from the outer end of said last named shaft and having at its free end a laterally extending finger, and a bar projecting laterally from the outer end of the shaft and having in its end a cavity into which the finger is normally sprung.

In testimony whereof I have hereunto set my hand in presence of two subscribing witnesses.

EDWARD V. BODDY.

Witnesses:
B. B. WILLIAMS,
W. J. GUTHERA.